(12) United States Patent
Hayashi et al.

(10) Patent No.: US 10,955,689 B2
(45) Date of Patent: Mar. 23, 2021

(54) CONTACT LENS AND STORAGE MEDIUM

(71) Applicant: SONY CORPORATION, Tokyo (JP)

(72) Inventors: Kazunori Hayashi, Tokyo (JP); Yoichiro Sako, Tokyo (JP); Takayasu Kon, Tokyo (JP); Takatoshi Nakamura, Tokyo (JP); Akira Tange, Tokyo (JP); Tomoya Onuma, Shizuoka (JP); Hiroyuki Hanaya, Kanagawa (JP); Masakazu Yajima, Chiba (JP); Yuki Koga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 159 days.

(21) Appl. No.: 14/777,821

(22) PCT Filed: Feb. 25, 2014

(86) PCT No.: PCT/JP2014/054576
§ 371 (c)(1),
(2) Date: Sep. 17, 2015

(87) PCT Pub. No.: WO2014/178221
PCT Pub. Date: Nov. 6, 2014

(65) Prior Publication Data
US 2016/0299357 A1    Oct. 13, 2016

(30) Foreign Application Priority Data

May 2, 2013   (JP) .............................. JP2013-096904

(51) Int. Cl.
*G02C 7/10*      (2006.01)
*G02C 7/04*      (2006.01)
(Continued)

(52) U.S. Cl.
CPC ............... *G02C 7/101* (2013.01); *G02C 7/04* (2013.01); *G02C 7/046* (2013.01); *H04N 5/225* (2013.01);
(Continued)

(58) Field of Classification Search
CPC .......... G02C 7/023; G02C 7/04; G02C 7/046; G02C 7/08; G02C 7/081; G02C 7/083;
(Continued)

(56) References Cited

U.S. PATENT DOCUMENTS

2003/0021601 A1*  1/2003  Goldstein .............. G03B 17/00
                                                                  396/263
2006/0227067 A1* 10/2006  Iwasaki .................. G02B 27/00
                                                                  345/8

(Continued)

FOREIGN PATENT DOCUMENTS

JP         07-121114 A     5/1995
JP       2003-177449 A     6/2003
(Continued)

*Primary Examiner* — Thomas K Pham
*Assistant Examiner* — Ibrahima Diedhiou
(74) *Attorney, Agent, or Firm* — Chip Law Group

(57) ABSTRACT

Provided is a contact lens including: a lens unit configured to be worn on an eyeball; an adjustment unit configured to adjust light to be transmitted through at least one of a first region that is a central portion of the lens unit and covers a pupil of the eyeball and a second region that is an outer side of the first region and covers an iris of the eyeball; and a control unit configured to control the adjustment unit in response to input of a trigger signal.

11 Claims, 10 Drawing Sheets

(51) Int. Cl.
*H04N 5/232* (2006.01)
*H04N 5/225* (2006.01)

(52) U.S. Cl.
CPC ......... *H04N 5/232* (2013.01); *H04N 5/23218* (2018.08)

(58) Field of Classification Search
CPC .......... G02C 7/10; G02C 7/101; G02C 7/102; G02C 11/10; G02B 7/023; G02B 7/08; G02B 7/102; G02B 2027/0116; G02B 2027/0138; G02B 2027/0178; G02B 2027/0187; G02B 27/0093; G02B 27/017; G02B 27/08; G03B 11/00; G03B 17/48; G03B 27/0093; A61B 3/113; A61B 5/6821; A61B 2560/0242; A61B 2562/0219; G06F 1/163; G06F 1/3206; G06F 3/011; G06F 3/012; G06F 3/013; G06F 3/017; G06F 3/038; G06T 2207/10024; G06T 2207/20104; H04N 5/225; H04N 5/2253; H04N 5/2254; H04N 5/2257; H04N 5/232; H04N 5/23219; H04N 5/23222; H04N 5/23293; H04N 5/335; H04N 9/07; H04N 13/0207; H04N 21/4223; H04N 2201/0084; H04M 2250/12; H04M 2250/52

USPC ............ 351/159.02, 159.03, 156.24, 159.25; 345/8, 156, 589, 592; 348/78, 207.1, 348/207.99, 222.1, 231.99, 294, 333.01, 348/340, E9.003; 359/315, 363, 359/722–723, 738, 890–891; 382/103, 382/312; 715/863; 396/18; 156/250

See application file for complete search history.

(56) References Cited

U.S. PATENT DOCUMENTS

| | | | | |
|---|---|---|---|---|
| 2011/0069276 | A1* | 3/2011 | Tucker | G02C 7/046 |
| | | | | 351/159.24 |
| 2011/0274680 | A1* | 11/2011 | Mazed | A61K 36/02 |
| | | | | 424/94.4 |
| 2014/0243971 | A1* | 8/2014 | Pugh | G02C 7/04 |
| | | | | 623/6.22 |

FOREIGN PATENT DOCUMENTS

| | | |
|---|---|---|
| JP | 2006-292883 A | 10/2006 |
| JP | 2010-211210 A | 9/2010 |
| JP | 2012521014 A | 9/2012 |
| JP | 2013506159 A | 2/2013 |

* cited by examiner

CONTACT LENS AND STORAGE MEDIUM

TECHNICAL FIELD

The present disclosure relates to a contact lens and a storage medium.

BACKGROUND ART

In recent years, contact lenses that are directly worn on eyeballs are practically used as visual sensation correction devices. Further, contact lenses are used not only for correcting visual sensation but also for changing appearance of eyes, and, in this case, lenses are colored.

Many colored contact lenses (color contact lens) have been used in recent years, and, usually, a user actually tries on a color contact lens to check appearance of his/her eye and determines which color of a lens suits the user. Herein, the following Patent Literature 1 discloses a system that simulates appearance of a user wearing a color contact lens and presents the simulated appearance in order to reduce economic and material waste of contact lenses for trial fitting.

Further, recently, the following Patent Literature 2 has disclosed an image display device using contact lenses. Patent Literature 2 proposes a thin image display device in which a display unit and a lens array unit are integrally provided on a curved surface, the thin image display device being shaped to be fully wearable on an eye such as a contact lens.

A contact lens having an ultraviolet (UV) filter is also proposed. Although sunglasses are also used to protect eyes from ultraviolet rays and intense light, the sunglasses do not cover whole eyes and are therefore ineffective in protection from lateral light. Wearing a contact lens having a UV filter can block entry of more ultraviolet rays.

CITATION LIST

Patent Literature
Patent Literature 1: JP 2010-211210A
Patent Literature 2: JP 2006-292883A

SUMMARY OF INVENTION

Technical Problem

However, the above Patent Literatures 1 and 2 do not mention active adjustment of light to be transmitted through a contact lens.

In view of this, the present disclosure provides a contact lens and a storage medium, each of which is novel and improved and is capable of adjusting light to be transmitted through the contact lens.

Solution to Problem

According to the present disclosure, there is provided a contact lens including: a lens unit configured to be worn on an eyeball; an adjustment unit configured to adjust light to be transmitted through at least one of a first region that is a central portion of the lens unit and covers a pupil of the eyeball and a second region that is an outer side of the first region and covers an iris of the eyeball; and a control unit configured to control the adjustment unit in response to input of a trigger signal.

According to the present disclosure, there is provided a storage medium having a program stored therein, the program causing a computer to function as: an adjustment unit configured to adjust light to be transmitted through at least one of a first region that is a central portion of a lens unit configured to be worn on an eyeball and covers a pupil of the eyeball and a second region that is an outer side of the first region and covers an iris of the eyeball; and a control unit configured to control the adjustment unit in response to input of a trigger signal.

Advantageous Effects of Invention

As described above, according to the present disclosure, it is possible to adjust light to be transmitted through a contact lens.

DESCRIPTION OF EMBODIMENTS

Figure 1:
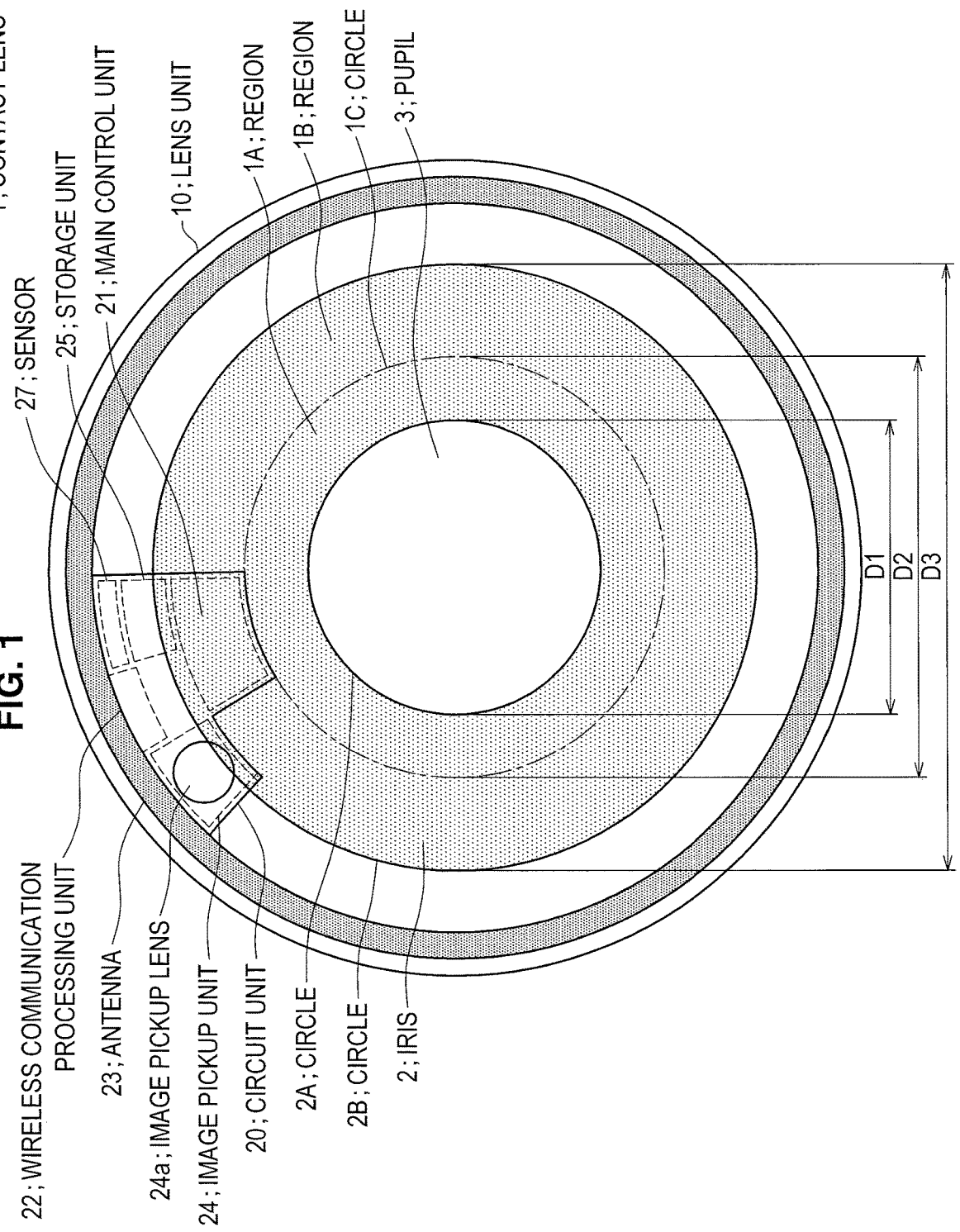
FIG. 1 is a planar view illustrating an example of an appearance configuration of a contact lens according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.

1. Outline of contact lens according to embodiment of present disclosure
  1-1. Appearance configuration
  1-2. Functional configuration
2. Adjustment processing in region 1A 3. Adjustment processing in region 1B
3-1. Mode switching
3-2. Processing of normal input mode
3-3. Processing of detail input mode
4. Conclusion <<1. Outline of Contact Lens According to Embodiment of Present Disclosure>>

An outline of a contact lens 1 according to an embodiment of the present disclosure will be described. The contact lens 1 according to this embodiment includes a lens unit 10 (see FIG. 1) having a curved-surface shape and can be fully worn on an eye 4 (eyeball 4A) (see FIG. 2) and be removed therefrom. A circuit unit 20 (see FIG. 1) is provided in the lens unit 10. A smooth portion made of transparent synthetic resin or the like is formed on an external side of the circuit unit 20 provided in the lens unit 10 (opposite direction of an eyeball contact surface of the lens unit 10). With this, when the user wears the contact lens 1 on the eye 4, an eyelid of the user can be smoothly moved thereon.

(Background)

As described above, in recent years, more and more users wear prescription contact lenses for correcting visual sensation, color contact lenses for changing appearance of eyes, or contact lenses with UV filters for blocking ultraviolet rays. Further, high functionalization of such contact lenses for daily use is also proposed.

However, active adjustment of light to be transmitted through a contact lens has never been proposed.

In view of this, a high-function contact lens according to each embodiment of the present disclosure has been made in consideration of the above circumstances. The contact lens according to each embodiment of the present disclosure actively adjusts light to be transmitted through the contact lens, so that an amount of light to be transmitted can be reduced in accordance with ultraviolet rays and intense light or a color and a pattern of appearance of the contact lens can be adjusted. This remarkably improves usability of the contact lens.

A configuration of such a contact lens according to this embodiment will be specifically described below with reference to FIG. 1 to FIG. 3.

<1-1. Appearance Configuration>

FIG. 1 is a planar view illustrating an example of an appearance configuration of the contact lens 1 according to an embodiment of the present disclosure. As illustrated in FIG. 1, the contact lens 1 according to this embodiment includes the lens unit 10 worn on an eyeball and is divided into 2 regions, i.e., a region 1A (first region) on an inner side of a circle 1C and a region 1B (second region) on an outer side thereof, seen from the front of the eyeball.

A diameter D2 of the circle 1C is substantially equal to or larger than a maximum diameter D1 of an inner circle 2A of an iris 2 of a human eye. In FIG. 1, the inner circle 2A of the iris 2 indicates a size of a pupil 3, and the maximum diameter D1 of the circle 2A indicates a maximum diameter of the pupil. Further, the region 1A (first region) according to this embodiment is placed in the central portion of the lens unit 10 as illustrated in FIG. 1 and can cover the pupil 3 in the case where the contact lens 1 is normally worn on an eye. Therefore, for example, the region 1A (inner side of the circle 1C) is formed to have a diameter whose size is larger than at least 8 mm that is generally considered to be a maximum diameter of a pupil. Further, the region 1A includes a first adjustment unit 28A as described below with reference to FIG. 2.

The region 1B (second region) on an outer side of the circle 1C can cover at least the iris 2 in the case where the contact lens 1 is normally worn on the eye. The region 1B includes a second adjustment unit 28B as described below with reference to FIG. 2. The circuit unit 20, which will be described below with reference to FIG. 3, is provided in the region 1B on the outer side of the circle 1C. The circuit unit 20 includes a main control unit 21, a wireless communication processing unit 22, an antenna 23, an image pickup unit 24 including an image pickup lens 24a, a storage unit 25, and a sensor 27. The circuit unit 20 is placed to output control signals for making adjustment to the first adjustment unit 28A forming the region 1A and the second adjustment unit 28B forming the region 1B.

(Main Control Unit 21)

The main control unit 21 includes, for example, a microcomputer (microchip, IC chip) including a central processing unit (CPU), a read only memory (ROM), and a random access memory (RAM) and controls each configuration of the circuit unit 20.

For example, the main control unit 21 senses ultraviolet rays and a light amount and controls the first adjustment unit 28A forming the region 1A in accordance with a sensing result. Further, the main control unit 21 detects blinking of the eyelid that is in contact with the contact lens 1 and controls the second adjustment unit 28B forming the region 1B in accordance with the blinking. A specific configuration of the main control unit 21 according to this embodiment will be described below with reference to FIG. 3.

(Wireless Communication Processing Unit 22 and Antenna 23)

The antenna 23 is wirelessly connected to an external device and has a function of transmitting and receiving data and a function of supplying and receiving electric power. The external device is, for example, a smartphone, a tablet terminal, a personal computer (PC), or the like, which exists in the vicinity of the contact lens 1, or a contact lens 1 according to this embodiment worn on the other eye. Supply and reception of electric power can be achieved by, for example, an electromagnetic induction method, a radio wave method, or an electromagnetic field resonance method.

The wireless communication processing unit 22 has a function of performing various kinds of signal processing with respect to data transmitted and received by the antenna 23 and a function of performing processing of supply and reception of electric power using the antenna 23. For example, the wireless communication processing unit 22 can transmit information indicating a pattern and a color of the region 1B to the contact lens 1 worn on the other eye and can therefore synchronize appearance of the pair of contact lenses 1 that the user wears.

(Image Pickup Unit 24)

The image pickup unit 24 includes, for example, a lens system including the image pickup lens 24a, an aperture stop, a zoom lens, a focus lens, and the like, a drive system that causes the lens system to perform focusing operation and zooming operation, and a solid-state image pickup element array that performs photoelectric conversion with respect to image pickup light obtained in the lens system to thereby generate an image pickup signal. The solid-state image pickup element array may be realized by, for example, a charge coupled device (CCD) sensor array or a complementary metal oxide semiconductor (CMOS) sensor array.

As illustrated in FIG. 1, the image pickup lens 24a is provided so that a gaze direction of the user who wears the contact lens 1 is an image pickup direction.

The image pickup unit 24 includes an image pickup signal processing unit that performs processing with respect to a signal obtained by a solid-state image pickup element to thereby obtain an image pickup signal serving as digital data. For example, the image pickup signal processing unit may perform image stabilization for correcting blur of a captured image, the blur being caused by motion of the eyeball. The image pickup unit 24 outputs the acquired captured image (digital data) to the main control unit 21.

(Storage Unit 25)

The storage unit 25 is a part that records and plays back data by using a predetermined recording medium. The recording medium can be any one of various kinds of recording media such as a permanent memory including a flash memory, and the storage unit 25 only needs to execute recording and playback in accordance with a recording medium to be employed.

Information for adjusting the region 1B covering the iris 2 to a predetermined pattern and a predetermined color is registered in the storage unit 25 according to this embodiment.

(Sensor 27)

The sensor 27 is any one of various kinds of sensors for sensing external environment (peripheral) information of the contact lens 1 and is, for example, a pressure sensor, a magnetic force sensor, a vibration sensor, or an acceleration sensor. The sensor 27 outputs a sensing result to the main control unit 21.

In the above description, the configuration of the circuit unit 20 provided in the lens unit 10 of the contact lens 1 has been described. Note that the configuration of the circuit unit 20 is not limited to the example illustrated in FIG. 1 and may be, for example, a configuration that does not include the antenna 23. In this case, the circuit unit 20 wirelessly communicates with an external device via a human body. Further, the circuit unit 20 may be a configuration that includes a battery. Further, the configuration of the circuit unit 20 may be a configuration that does not include the image pickup unit 24. Further, arrangement of configurations of the circuit unit 20 illustrated in FIG. 1 is merely an example, and the circuit unit 20 according to this embodiment may have arrangement that is different from the arrangement of FIG. 1.

The first adjustment unit 28A forming the region 1A and the second adjustment unit 28B forming the region 1B will be specifically described with reference to FIG. 2. Note that, in the following description, in the case where there is no particular need to separately describe the first adjustment unit 28A and the second adjustment unit 28B, the first adjustment unit 28A and the second adjustment unit 28B are collectively referred to as the "adjustment unit 28".

(Adjustment Unit 28)

Figure 2:
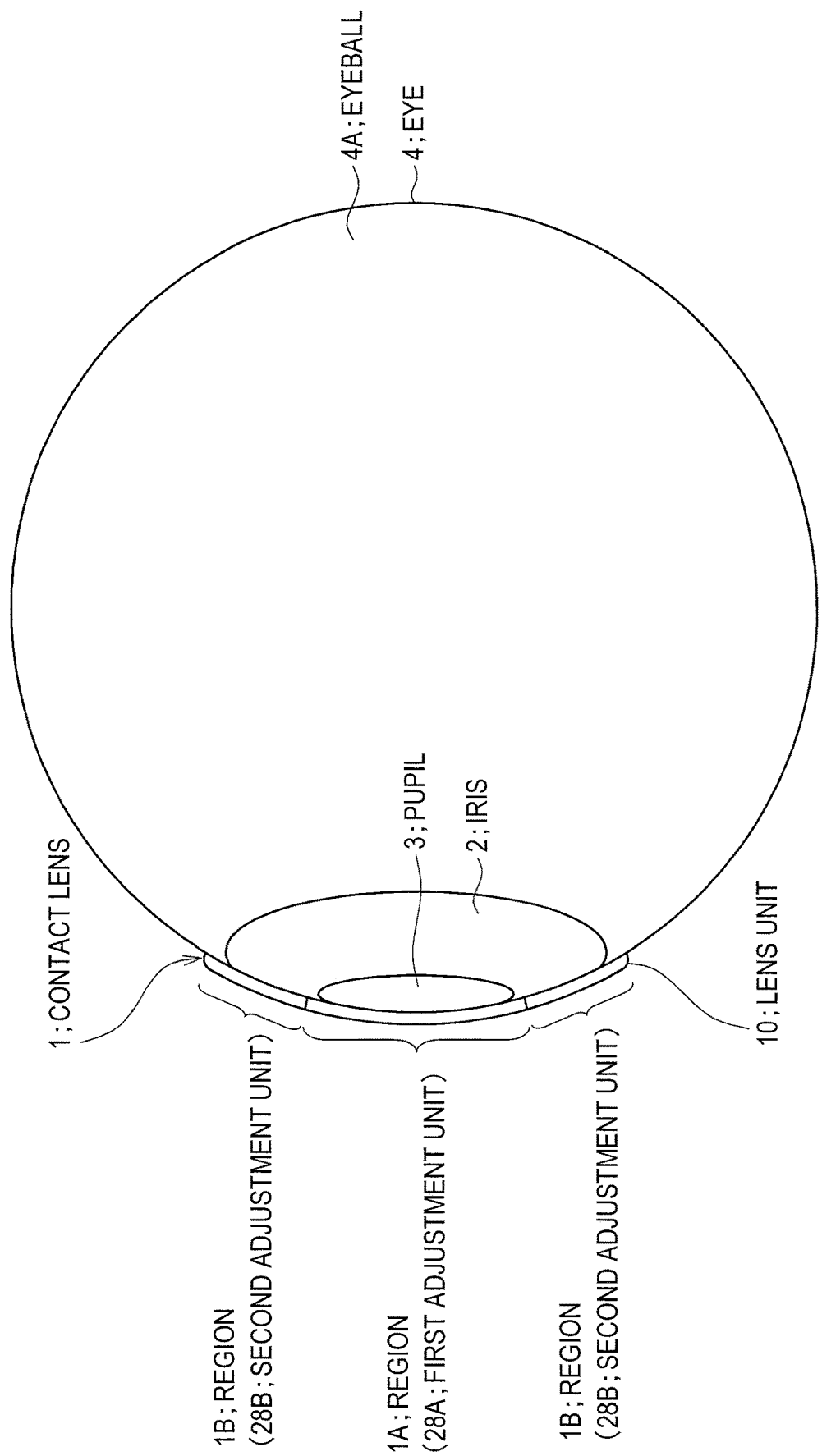
FIG. 2 illustrates an adjustment unit according to this embodiment.

FIG. 2 illustrates the adjustment unit 28 according to this embodiment. As illustrated in FIG. 2, the contact lens 1 includes the lens unit 10 having a curved-surface shape and is fully worn on the eye 4 (eyeball 4A).

As illustrated in FIG. 2, in the case where the contact lens 1 is normally worn on the eye 4, the region 1A (first region) of the central portion of the lens unit 10 can cover the pupil 3. The region 1A includes the first adjustment unit 28A, and the first adjustment unit 28A adjusts an amount or a wavelength region of light to be transmitted through the region 1A.

Specifically, the first adjustment unit 28A is realized by a liquid crystal shutter, a polarizing filter, or the like. The first adjustment unit 28A may also be realized by a display unit including a plurality of display elements.

Each display element includes, for example, a liquid crystal display device, an organic electroluminescence (EL) display device, a field emission display (FED) display device, or the like. Each display element has a display region that presents an image to the user who wears the contact lens 1, and the display elements may independently display respective images or all the display elements may display a single image. Further, the display unit allows external light to be transmitted therethrough when the display unit does not display an image, and therefore the user can visually recognize an image of the outside (scene of real space).

The first adjustment unit 28A may be realized by a member in which an electrochromic (oxidation-reduction) reaction is applied and may adjust an amount of light to be transmitted by changing reflectivity of natural light.

The first adjustment unit 28A according to this embodiment can block ultraviolet rays and reduce a light amount exceeding a threshold (intense light) by adjusting light to be transmitted through the region 1A in accordance with control performed by the main control unit 21. With this, even in the case where the user does not wear sunglasses, the user can protect his/her eyes from ultraviolet rays and intense light by wearing the contact lenses 1. Further, in the case where the user always wears sunglasses, the user cannot see surroundings clearly when the user moves to a dark place. However, the contact lens 1 according to this embodiment actively adjusts light to be transmitted as necessary in accordance with a sensing result of ultraviolet rays and a light amount, and therefore such a problem is solved.

Meanwhile, the region 1B (second region) on the outer side of the region 1A can cover the iris 2 in the case where the contact lens 1 is normally worn on the eye 4 as illustrated in FIG. 2. The region 1B includes the second adjustment unit 28B, and the second adjustment unit 28B adjusts light to be transmitted through the region 1B. More specifically, the second adjustment unit 28B actively adjusts a pattern and a color of appearance of an iris part of the contact lens 1.

The second adjustment unit 28B according to this embodiment is realized by, for example, a color filter or a dye-sensitized solar cell. The color filter is a color filter whose color is changed depending on a voltage (current), a frequency, or a waveform pattern and may be a member having an electrochromic property. Generally, a member having an electrochromic property (e.g., organic/metal hybrid polymer) maintains display even after power supply is turned off. This makes it possible to reduce electric power consumption.

Electric power generation of the dye-sensitized solar cell is changed depending on a depth of a color. By realizing the second adjustment unit 28B with the use of the dye-sensitized solar cell, it is possible to adjust the color and the pattern of the region 1B (iris part) and continuously supply electric power.

The second adjustment unit 28B may be realized by a reflective liquid crystal display unit. The reflective liquid crystal display unit includes a plurality of display elements. The display elements include the display regions, respectively, and the display elements may independently display respective images or all the display elements may display a single image.

The second adjustment unit 28B according to this embodiment can change the color and the pattern of appearance of the region 1B covering the iris in accordance with control performed by the main control unit 21. With this, the user can change appearance of the iris to a different color and a different pattern (design) and enjoy the changed appearance while wearing the contact lenses 1 without exchanging color contact lenses.

In the above description, the appearance configuration (hardware configuration) of the contact lens 1 according to this embodiment has been described in detail. A functional configuration of the contact lens 1 will be specifically described with reference to FIG. 3.

<1-2. Functional Configuration>

Figure 3:
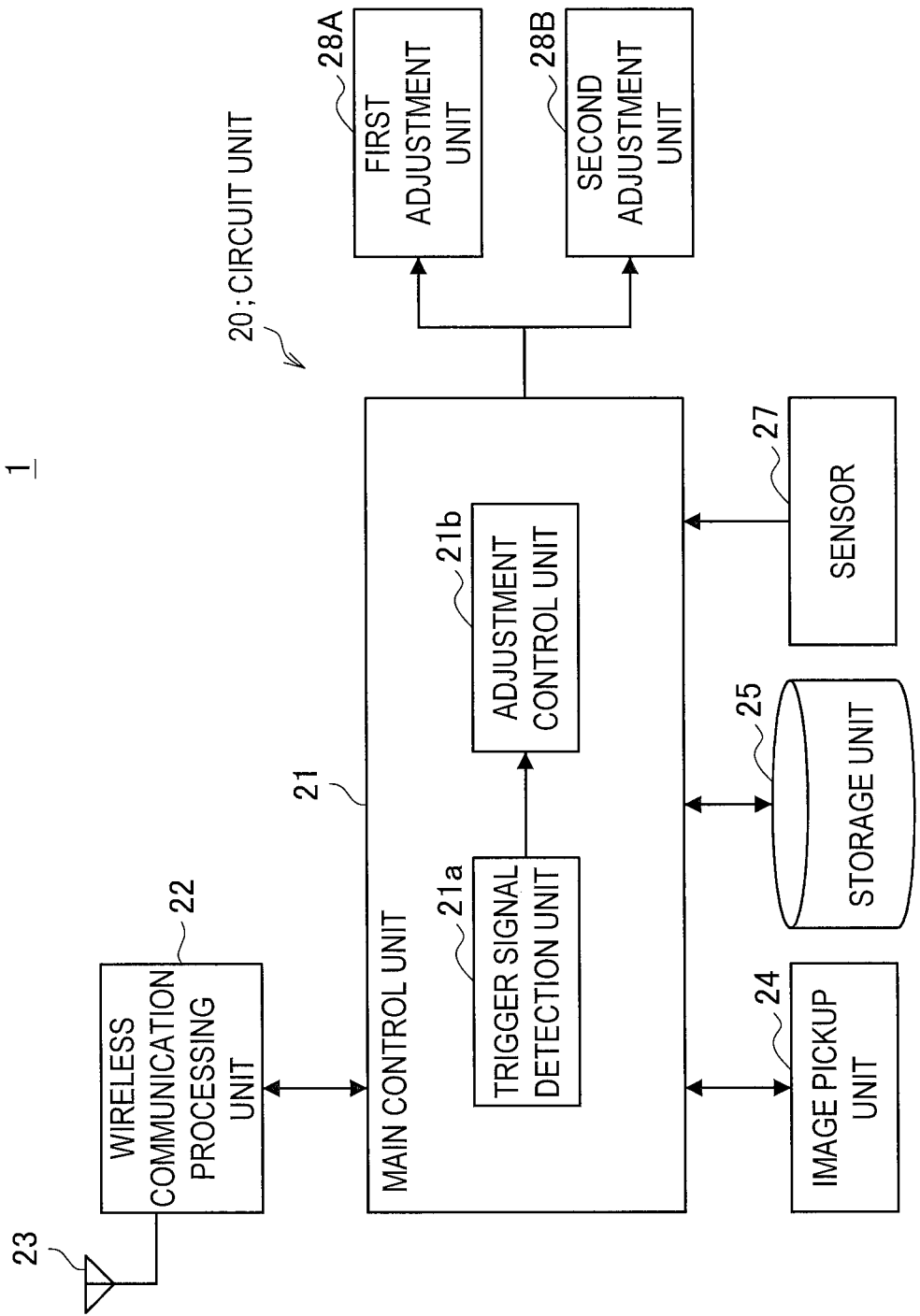
FIG. 3 is block diagram showing an example of a functional configuration of a contact lens according to this embodiment.

FIG. 3 is block diagram showing an example of the functional configuration of the contact lens 1 according to this embodiment. As shown in FIG. 3, the contact lens 1 includes the circuit unit 20 including the main control unit 21, the wireless communication processing unit 22, the antenna 23, the image pickup unit 24, the storage unit 25, and the sensor 27, the first adjustment unit 28A, and the second adjustment unit 28B. Note that the wireless communication processing unit 22, the antenna 23, the image pickup unit 24, the storage unit 25, the sensor 27, and the adjustment unit 28 have been described with reference to FIG. 1 and FIG. 2, and therefore detailed description thereof is herein omitted.

The main control unit 21 functions as a trigger signal detection unit 21a and an adjustment control unit 21b as shown in FIG. 3.

(Trigger Signal Detection Unit 21a)

The trigger signal detection unit 21a obtains, from the outside, a trigger signal for allowing the adjustment control unit 21b to perform adjustment control and outputs the trigger signal to the adjustment control unit 21b. More specifically, for example, the trigger signal detection unit 21a detects a particular gesture, blinking (eyelid closing/eyelid opening time period, the number of times of blinking, blinking pattern, or the like), a light amount, or the like as a trigger signal on the basis of a captured image captured by the image pickup unit.

The trigger signal detection unit 21a may detect a sensing result of the sensor 27 as a trigger signal. Specifically, for example, a vibration sensor (example of sensor 27) can sense vibration caused by the user lightly striking a part in the vicinity of the eye 4 on which the contact lens 1 is worn and can detect the vibration as a trigger signal. With this, the user can input a trigger signal by lightly striking a part in the vicinity of the eye on which the contact lens 1 is worn. Further, the trigger signal detection unit 21a may detect, as a trigger signal, a sensing result of a pollen sensor or a radioactive material sensor (examples of sensor 27) depending on a type.

The trigger signal detection unit 21a may receive a trigger signal from an external device via the antenna 23 and the wireless communication processing unit 22. For example, the trigger signal detection unit 21a detects, as a trigger signal, a signal (reception signal) for issuing an instruction to change the pattern and the color of the region 1B covering the iris 2, the signal being received from a smartphone or a tablet terminal (examples of external device). Further, the trigger signal detection unit 21a may receive information, such as flying of photochemical smog or radioactive material or flying of pollen, as a trigger signal from a predetermined server in a network.

In the case where a solar cell power generation unit is provided in the lens unit 10 of the contact lens 1, such as a case where the second adjustment unit 28B is realized by the dye-sensitized solar cell, the trigger signal detection unit 21a may detect a light amount as a trigger signal on the basis of electric power generation of the solar cell power generation unit.

(Adjustment Control Unit 21b)

The adjustment control unit 21b controls the first adjustment unit 28A and the second adjustment unit 28B in accordance with a trigger signal detected by the trigger signal detection unit 21a. More specifically, for example, the adjustment control unit 21b outputs a control signal to the first adjustment unit 28A so as to adjust an amount or a wavelength region of light to be transmitted through the region 1A in accordance with a light amount, ultraviolet rays, or the like detected as a trigger signal. Further, the adjustment control unit 21b outputs a control signal to the first adjustment unit 28A so as to make an adjustment to perform warning display (semitransparent red color screen, display indicating a flying direction, or the like) in the region 1A in accordance with flying of pollen or flying of radio-active material detected as a trigger signal. Further, the adjustment control unit 21b outputs a control signal to the first adjustment unit 28A so as to adjust an amount or a wavelength region of light to be transmitted through the region 1A in accordance with a current position (positioned by, for example, a GPS that is an example of the sensor 27) detected as a trigger signal. With this, for example, in the case where the user is on the beach or in a ski resort, the region 1A can function as a UV filter for blocking ultraviolet rays.

The adjustment control unit 21b outputs a control signal to the second adjustment unit 28B so as to adjust at least one of the color and the pattern of the region 1B in accordance with a gesture, blinking, a reception signal, or the like detected as a trigger signal. The color and the pattern of the region 1B are selected and determined by the adjustment control unit 21b in accordance with a trigger signal and are extracted from, for example, data registered in the storage unit 25.

Figure 4:
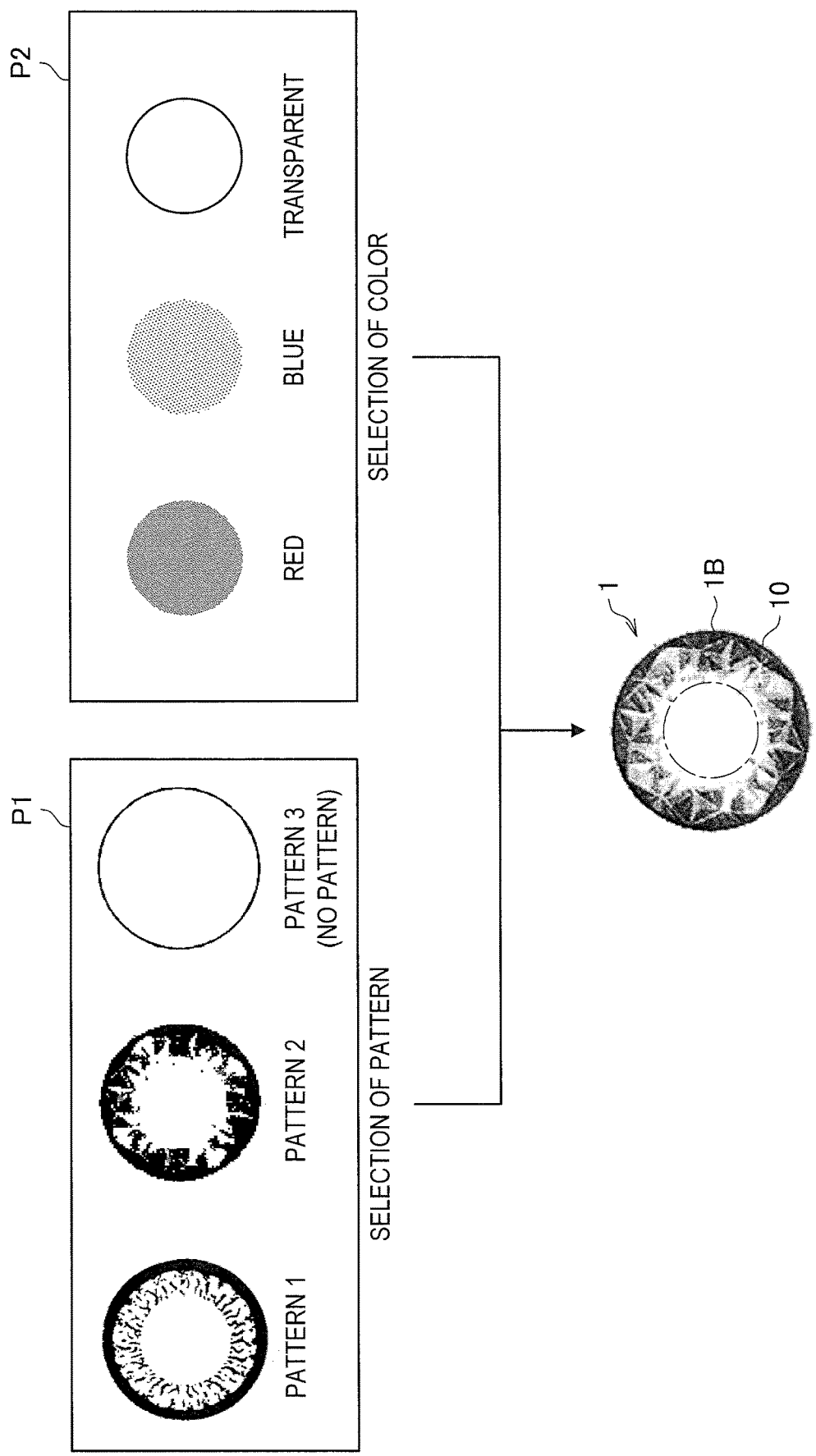
FIG. 4 illustrates selection of a pattern and a color of a region 1B according to this embodiment.

Herein, adjustment of the color and the pattern of the region 1B by the adjustment control unit 21b will be specifically described with reference to FIG. 4. FIG. 4 illustrates selection of the pattern and the color of the region 1B according to this embodiment. As illustrated in FIG. 4, the adjustment control unit 21b selects a pattern from, for example, pattern data P1 registered in the storage unit 25 in accordance with a trigger signal (operation input by user using a gesture, blinking, a reception signal, or the like). The pattern data P1 includes data of a plurality of patterns (pattern 1, pattern 2, and pattern 3) and includes at least data of no pattern (pattern 3) as default.

The adjustment control unit 21b selects a color from, for example, color data P2 registered in the storage unit 25 in accordance with a trigger signal (operation input by user using a gesture, blinking, a reception signal, or the like). The color data P2 includes data of a plurality of colors and includes at least data of a transparent color as default.

As illustrated in FIG. 4, the adjustment control unit 21b adjusts the color and the pattern of the region 1B in the lens unit 10 of the contact lens 1 so as to achieve a pattern (e.g., pattern 2) selected from the pattern data P1 and a color (e.g., blue color) selected from the color data P2. Specifically, the adjustment control unit 21b outputs a control signal to the second adjustment unit 28B so as to make an adjustment to achieve the selected pattern and the selected color.

The adjustment control unit 21b may output a control signal to the second adjustment unit 28B so as to make an adjustment to prevent the color and the pattern displayed in the signal region 1B from covering the pupil in consideration of the diameter of the pupil that changes in response to brightness on the basis of a light amount detected as a trigger signal.

In the above description, the functional configuration of the contact lens 1 according to this embodiment according to this embodiment has been described in detail. Next, operation processing of the contact lens 1 according to this embodiment will be described. The main control unit 21 of the contact lens 1 according to this embodiment controls the first adjustment unit 28A to adjust transmission of light through the region 1A covering the pupil 3 and controls the second adjustment unit 28B to adjust transmission of light through the region 1B covering the iris 2 as described above. Adjustment processing in each of the regions 1A and 1B will be sequentially described below with reference to FIG. 5 to FIG. 11.

<<2. Adjustment Processing in Region 1A>>

Figure 5:
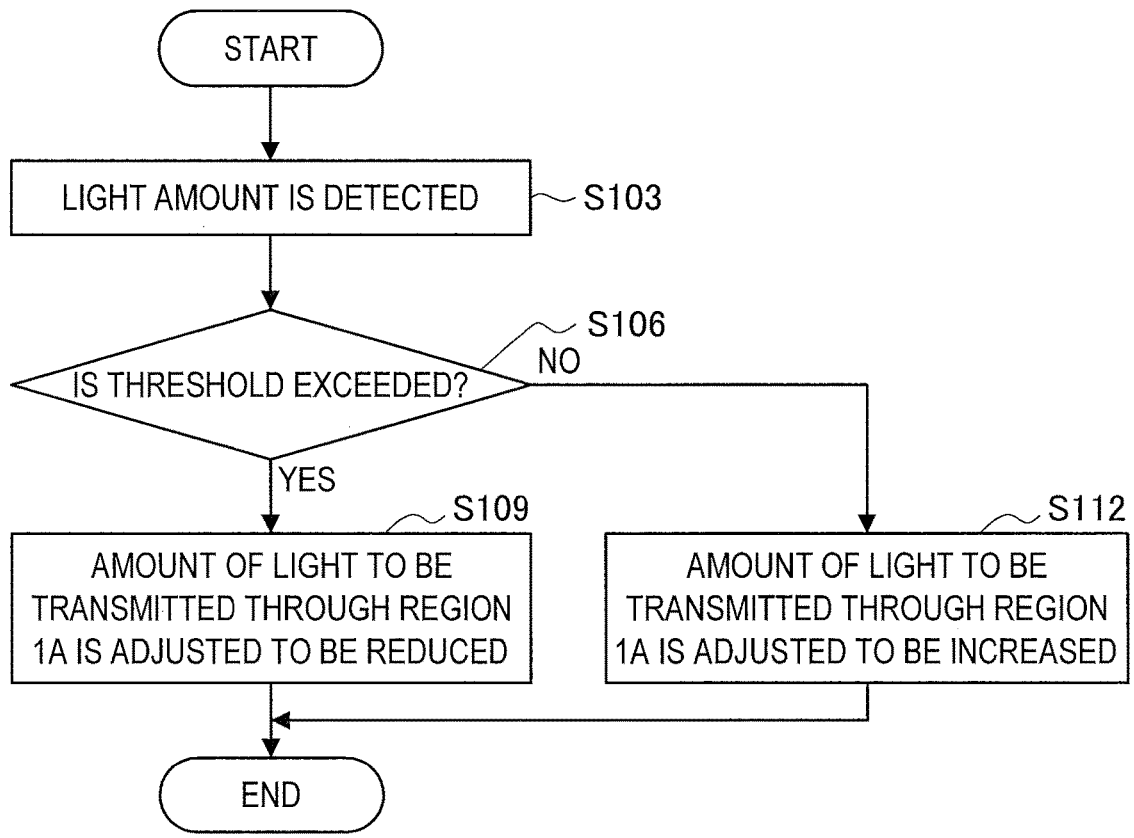
FIG. 5 is a flowchart showing processing for adjusting a light amount in a region 1A according to this embodiment.

FIG. 5 is a flowchart showing processing for adjusting a light amount in the region 1A according to this embodiment. As shown in FIG. 5, first, the trigger signal detection unit 21a detects a light amount of an external environment (amount of light reaching the contact lens 1) as a trigger signal on the basis of a captured image captured by the image pickup unit 24 or a sensing result of a light sensor (example of sensor 27) in Step S103. The trigger signal detection unit 21a outputs a value of the detected light amount to the adjustment control unit 21b.

Then, in Step S106, the adjustment control unit 21b determines whether or not the value of the light amount detected by the trigger signal detection unit 21a exceeds a threshold.

Then, in the case where the value exceeds the threshold (S106/Yes), in Step S109, the adjustment control unit 21b controls the first adjustment unit 28A so as to reduce an amount of light to be transmitted through the region 1A. Specifically, the adjustment control unit 21b controls the first adjustment unit 28A so that transmittance of light through the region 1A is reduced to be lower than a predetermined value. With this, in the case where the contact lens 1 according to this embodiment senses intense light, the contact lens 1 can adjust an amount of light to be transmitted through the region 1A of the lens unit 10 to the pupil 3, thereby automatically reducing glare.

On the contrary, in the case where the value is below the threshold (S106/No), in Step S112, the adjustment control unit 21b controls the first adjustment unit 28A so as to increase an amount of light to be transmitted through the region 1A. With this, in the case where, for example, the user moves from a bright place to a dark place, a state in which a transmission amount of light through the region 1A is small is controlled to be a state in which the transmission amount of light is large (original state before the transmission amount is reduced). This makes it possible to avoid a circumstance in which the user cannot see surroundings clearly when the user moves to the dark place because the transmission amount of light is kept to be small.

In the above description, adjustment of the amount of light to be transmitted through the region 1A has been described. Note that the adjustment control unit 21b according to this embodiment adjusts not only the amount of light to be transmitted through the region 1A but also a wavelength region of light to be transmitted through the region 1A, and therefore, for example, ultraviolet rays can be blocked.

<<3. Adjustment Processing in Region 1B>>

The adjustment processing in the region 1B will be described with reference to FIG. 6 to FIG. 11. The second adjustment unit 28B performs the adjustment processing in the region 1B in accordance with control performed by the adjustment control unit 21b. The adjustment control unit 21b outputs a control signal for adjusting the region 1B to the second adjustment unit 28B in accordance with a trigger signal detected by the trigger signal detection unit 21a.

The trigger signal is detected on the basis of a captured image captured by the image pickup unit 24, a sensing result of the sensor 27, or a reception signal received by the antenna 23 and the wireless communication processing unit 22 as described above. That is, the user can perform operation input for selecting the pattern and the color of the region 1B by, for example, the following method.

(a) Gesture Input

The user performs gesture input by moving his/her hand within an angle of view of the image pickup unit 24 and can therefore select the pattern and the color of the region 1B. Specifically, the image pickup unit 24 captures an image of motion of the user's hand, and the trigger signal detection unit 21a analyzes the captured image and detects a particular gesture as a trigger signal.

The adjustment control unit 21b may make an adjustment to achieve a color specified by the user as the color of the region 1B by setting levels of values of R/G/B, respectively, in accordance with the particular gesture detected as a trigger signal. Further, the adjustment control unit 21b may sequentially change the color of the region 1B to colors registered in advance in the storage unit 25 in accordance with a particular gesture and may further determine a color in accordance with a particular gesture.

The adjustment control unit 21b may switch a mode to a pattern registration mode (pattern registration mode M2-2 shown in FIG. 8) in accordance with a detected particular gesture and then may scan a pattern drawn on a paper medium, a photograph, or the like (obtained by capturing the pattern with the use of the image pickup unit 24) in accordance with a gaze direction of the user, thereby determining the pattern as the pattern of the region 1B. Further, the adjustment control unit 21b may sequentially change the pattern of the region 1B to patterns registered in advance in the storage unit 25 in accordance with a particular gesture and may further determine a pattern in accordance with a particular gesture.

The user can check a change in the color and the pattern of the region 1B (a change in appearance of the contact lens 1 worn on the eye 4) while, for example, looking at himself/herself in a mirror.

(b) Blinking Input

The user performs blinking input by moving the eyelid that is in contact with the contact lens 1 and can therefore select the pattern and the color of the region 1B. Specifically, the trigger signal detection unit 21a detects, as a trigger signal, a time period of blinking (eyelid closure/eyelid opening time period) or the number of times of blinking on the basis of a captured image of the image pickup unit 24 or a sensing result of a piezoelectric sensor (example of sensor 27). The adjustment control unit 21b can select the color and the pattern of the region 1B in accordance with the detected particular blinking time period or the detected particular number of times of blinking. Specific processing of blinking input will be described below with reference to FIG. 6 to FIG. 11.

(c) Wireless Input

The user can transmit data of a pattern and a color to be registered to the contact lens 1 from a communication terminal such as a smartphone or a tablet terminal via wireless communication. The adjustment control unit 21b of the contact lens 1 controls the second adjustment unit 28B so as to adjust the pattern and the color of the region 1B on the basis of the data of the pattern and the color received from the communication terminal via the antenna 23 and the wireless communication processing unit 22.

The user may transmit an instruction to change the pattern and the color of the region 1B to the contact lens 1 from a communication terminal such as a smartphone or a tablet terminal via wireless communication. The adjustment control unit 21b of the contact lens 1 controls the second adjustment unit 28B so as to adjust the pattern and the color of the region 1B in accordance with a received signal.

(d) Pressing Input

The user can perform operation input to change the pattern and the color of the region 1B by lightly striking or pressing a part in the vicinity of the eye 4 on which the contact lens 1 is worn. Specifically, the piezoelectric sensor (example of sensor 27) provided in the contact lens 1 senses pressing of an end of the eyelid or the like with the user's finger, and the adjustment control unit 21b controls the second adjustment unit 28B so as to sequentially change the pattern and the color of the region 1B in accordance with a sensing result (pressing time period, the number of times of pressing, or the like).

(e) Magnetic Force Input

The user may perform operation input to change the pattern and the color of the region 1B with respect to the contact lens 1 with the use of a magnet. For example, in the case where a ring with a magnet is approached to the eye 4 on which the contact lens 1 is worn, a magnetic sensor (example of sensor 27) of the contact lens 1 senses a change in a magnetic field, a magnetic pole (S/N poles), intensity of a magnetic force, or the like, and the trigger signal detection unit 21a detects a sensing result as a trigger signal. The adjustment control unit 21b controls the second adjustment unit 28B so as to adjust the pattern and the color of the region 1B in accordance with the sensing result of the magnetic sensor output from the trigger signal detection unit 21a. In the case where a time period for changing the magnetic field or the like is measured and the magnetic field is changed for a predetermined time period or more, the trigger signal detection unit 21a may detect the sensing result as a trigger signal.

(f) Head Operation Input (Head-Shaking Input)

The user may perform operation input to change the pattern and the color of the region 1B with respect to the contact lens 1 by performing operation of moving his/her head (shaking his/her head). For example, in the case where the user moves his/her head side to side or up and down, motion of the head is sensed by an acceleration sensor or a gyro sensor (examples of sensor 27) of the contact lens 1 worn on the eye 4, and the adjustment control unit 21b controls the second adjustment unit 28B so as to adjust the pattern and the color of the region 1B in accordance with a sensing result.

In the above description, specific examples of the operation input method performed by the user to select the pattern and the color of the region 1B have been described. In this embodiment, any one of the operation input methods described above may be used or at least 2 or more operation input methods may be used in combination. Next, operation processing for adjusting the pattern and the color of the region 1B in accordance with operation by the user will be specifically described. Note that, herein, a case where the pattern and the color of the region 1B are selected by blinking input will be described as an example.

The adjustment control unit 21b according to this embodiment executes adjustment processing of the color and the pattern of the region 1B in one operation mode which is one of a normal input mode M1 and a detail input mode M2. The normal input mode M1 is a mode in which a color and a pattern that have been already registered can be sequentially selected. In the detail input mode M2, it is possible not only to select a color and a pattern, but also to erase a registered color and a registered pattern, to register a new color and a new pattern, and to select synchronization of a color and a pattern of the contact lens 1 with those of the other contact lens 1.

Figure 6:
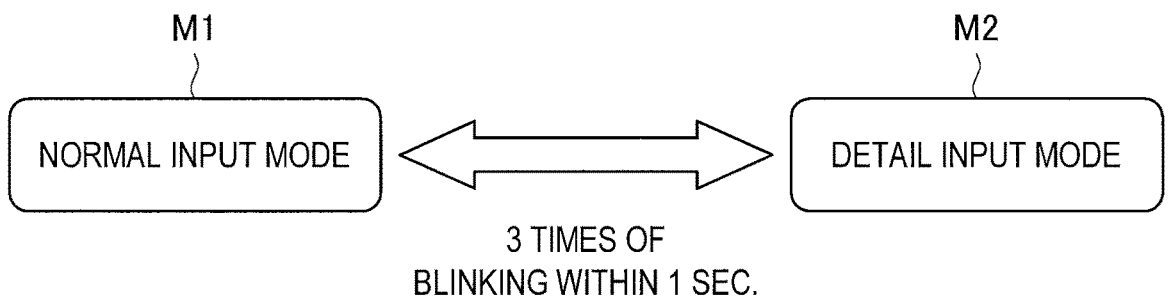
FIG. 6 shows switching of an input mode regarding adjustment of a color and a pattern in a region 1B according to this embodiment.

Herein, FIG. 6 shows switching of a determination input mode of a color and a pattern in the region 1B according to this embodiment. As shown in FIG. 6, the adjustment control unit 21b according to this embodiment switches the normal input mode M1 to the detail input mode M2 or the detail input mode M2 to the normal input mode M1 every time when, for example, the trigger signal detection unit 21a detects 3 times of blinking within 1 second. In the following description, operation processing of the normal input mode M1 and operation processing of the detail input mode M2 will be sequentially described.

<3-1. Processing of Normal Input Mode>

Figure 7:
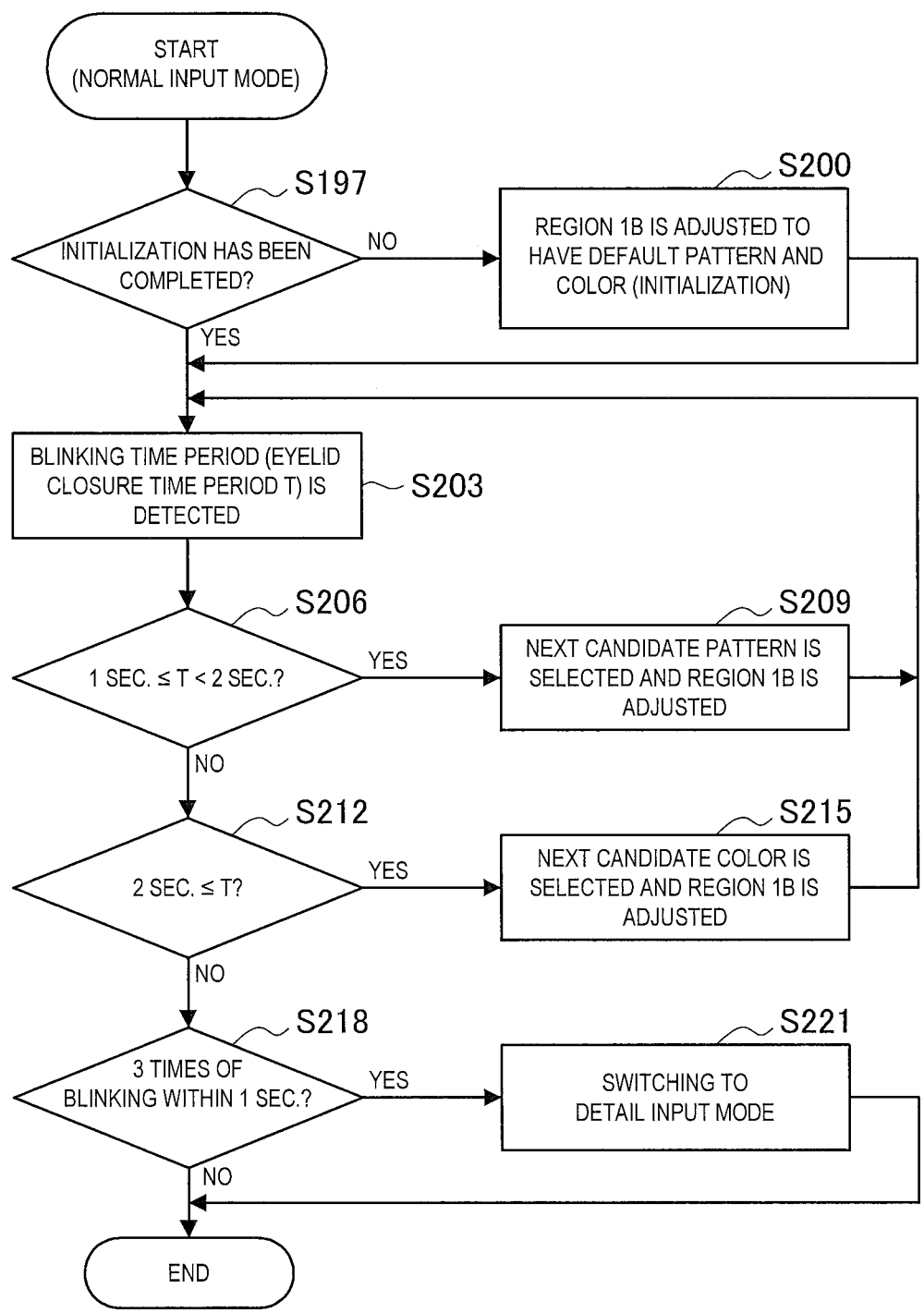
FIG. 7 is a flowchart showing processing of a normal input mode in a region 1B according to this embodiment.

FIG. 7 is a flowchart showing processing of the normal input mode M1 in the region 1B according to this embodiment. As shown in FIG. 7, first, the adjustment control unit 21b determines whether or not initialization has been completed in Step S197.

Then, in the case where the initialization has not been completed (S197/No), in Step S200, the adjustment control unit 21b controls the second adjustment unit 28B so as to adjust (initialize) the region 1B to a default pattern and a default color.

Then, in Step S203, the trigger signal detection unit 21a detects a blinking time period (specifically, eyelid closure time period T) of the eyelid that is in contact with the contact lens 1 on the basis of captured images consecutively captured by the image pickup unit 24. The trigger signal detection unit 21a outputs the detected eyelid closure time period T to the adjustment control unit 21b.

Then, in Step S206, the adjustment control unit 21b determines whether or not the eyelid closure time period T is 1 or more seconds but less than 2 seconds.

Then, in the case where it is determined that the eyelid closure time period T is 1 or more seconds but less than 2 seconds (S206/Yes), in Step S209, the adjustment control unit 21b selects the next candidate pattern and controls the second adjustment unit 28B so as to adjust the region 1B. The next candidate pattern is a pattern after the currently selected pattern among a plurality of patterns registered in the storage unit 25. With this, every time when the user performs conscious eyelid closure having the eyelid closure time period T of 1 or more seconds but less than 2 seconds, the region 1B is adjusted to sequentially have a different pattern. The user can select an arbitrary pattern from patterns sequentially appearing in the region 1B (iris part) of the contact lens 1 worn on his/her eye 4 while, for example, looking at himself/herself in a mirror.

On the contrary, in the case where it is determined that the eyelid closure time period T is 2 or more seconds (S206/No, S212/Yes), in Step S215, the adjustment control unit 21b selects the next candidate color and controls the second adjustment unit 28B so as to adjust the region 1B. The next candidate color is a color after the currently selected pattern among a plurality of colors registered in the storage unit 25. With this, every time when the user performs conscious eyelid closure having the eyelid closure time period T of 2 or more seconds, the region 1B is adjusted to sequentially have a different color. The user can select an arbitrary color from colors sequentially appearing in the region 1B (iris part) of the contact lens 1 worn on his/her eye 4 while, for example, looking at himself/herself in a mirror.

Then, in the case where 3 times of blinking is detected within 1 second (S218/Yes), the adjustment control unit 21b switches the mode to the detail input mode M2 in Step S221.

In the above description, processing of the normal input mode M1 has been specifically described. Note that, although numerical values, which are criteria of the conscious eyelid closure time periods, are shown in the above S206 and S212, the above numerical values are merely examples, and therefore this embodiment is not limited thereto. For example, in the case where the eyelid closure time period T is 1 or more seconds but less than 3 seconds, the next candidate pattern may be selected, and, in the case where the eyelid closure time period T is 3 or more seconds, the next candidate color may be selected.

<3-2. Processing of Detail Input Mode>

A case where the adjustment processing of the color and the pattern of the region 1B is executed in the detail input mode M2 will be specifically described with reference to FIG. 8 to FIG. 11.

Figure 8:
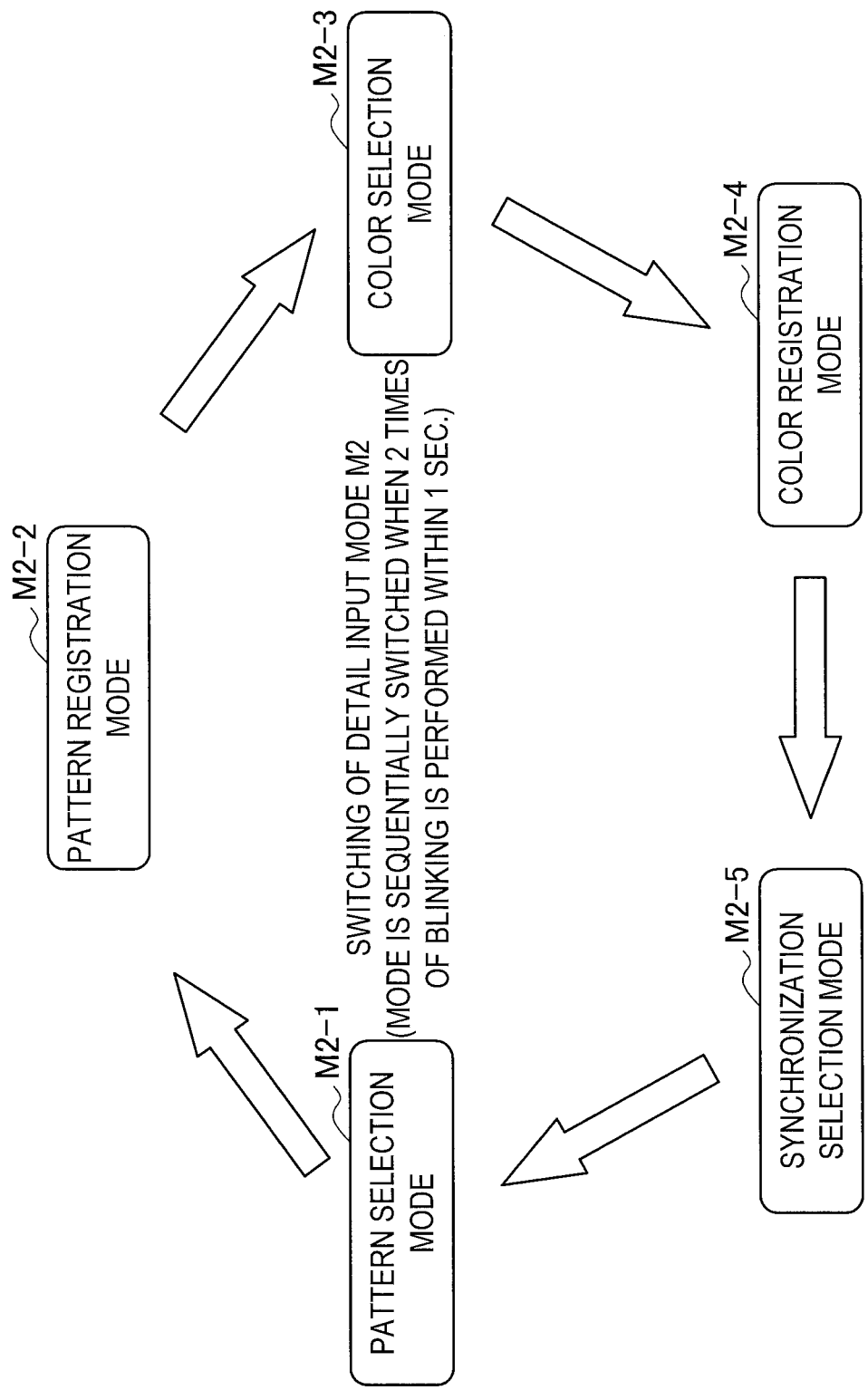
FIG. 8 shows switching of modes in a detail input mode in a region 1B according to this embodiment.

FIG. 8 shows switching of modes in a detail input mode in the region 1B according to this embodiment. As shown in FIG. 8, the detail input mode M2 includes a plurality of modes such as a pattern selection mode M2-1, a pattern registration mode M2-2, a color selection mode M2-3, a color registration mode M2-4, and a synchronization selection mode M2-5 and those modes are sequentially switched in response to operation by the user. Specifically, in the case where, for example, the trigger signal detection unit 21a detects 2 times of blinking within 1 second, the adjustment control unit 21b sequentially switches the above modes M2-1 to M-5. Note that order of the modes M2-1 to M2-5 shown in FIG. 8 is merely an example, and this embodiment is not limited thereto. The order may be different from the order shown in FIG. 8.

In the following description, specific operation processing performed when the mode is switched to each of the modes M2-1 to M2-5 will be described.

(3-2-1. Pattern/Color Selection Mode)

Figure 9:
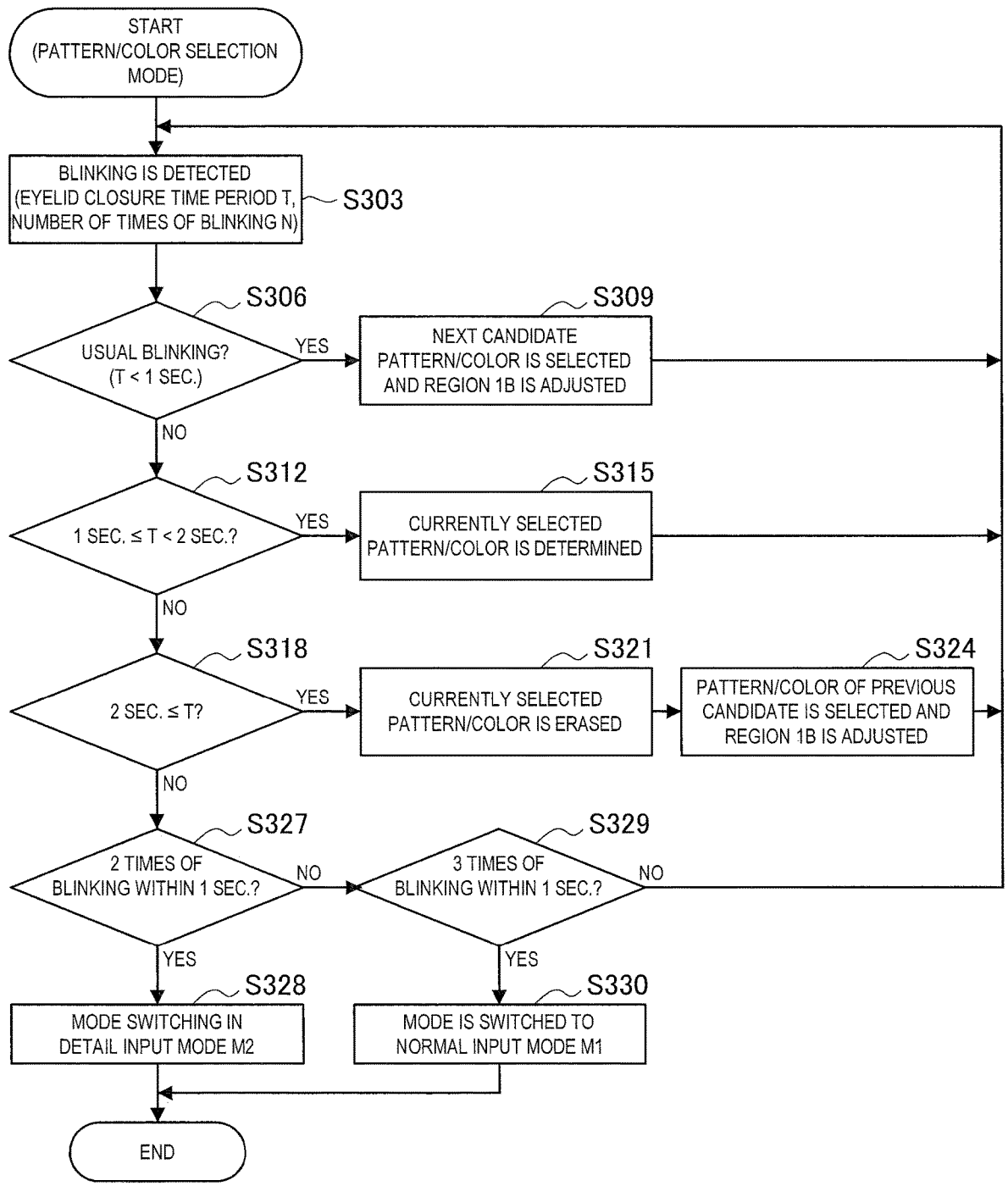
FIG. 9 is a flowchart showing processing of a pattern/color selection mode in a detail input mode according to this embodiment.

Operation processing performed when the mode is switched to the pattern selection mode M2-1 or the color selection mode M2-3 will be described with reference to FIG. 9. FIG. 9 is a flowchart showing processing of a pattern/color selection mode in the detail input mode according to this embodiment. In the pattern or color selection mode, it is possible to adjust the region 1B to a pattern and a color selected by the user from the patterns and the colors registered in the storage unit 25.

As shown in FIG. 9, in Step S303, the trigger signal detection unit 21a detects blinking of the eyelid that is in contact with the contact lens 1 on the basis of captured images consecutively captured by the image pickup unit 24. Specifically, the trigger signal detection unit 21a detects the eyelid closure time period T or the number of times of blinking N. A detection result is output to the adjustment control unit 21b.

Then, in Step S306, the adjustment control unit 21b determines whether or not the detected blinking is usual blinking (periodic blinking) Generally, a time period of unconscious periodic blinking is 0.2 second to 0.4 second, and therefore the adjustment control unit 21b can determine whether or not the blinking is usual blinking on the basis of, for example, whether or not the eyelid closure time period is less than 1 second.

Then, in the case where it is determined that the blinking is usual blinking (eyelid closure time period T is less than 1 second) (S306/Yes), in Step S309, the adjustment control unit 21b selects the next candidate pattern or color and controls the second adjustment unit 28B so as to adjust the region 1B.

On the contrary, in the case where it is determined that the blinking is not usual blinking (S306/No) and the eyelid closure time period T is 1 or more seconds but less than 2 seconds (S312/Yes), the adjustment control unit 21b determines the currently selected pattern or color in Step S315. With this, the user can sequentially change the pattern and the color of the region 1B (iris part) of the contact lens 1 worn on his/her eye 4 while, for example, looking at himself/herself in a mirror by performing usual blinking, and, when a pattern and a color to be fixed appears, the user can determine the pattern and the color by performing predetermined conscious eyelid closure (e.g., eyelid closure for 1 or more seconds but less than 2 seconds).

Further, in the case where it is determined that the blinking is not usual blinking (S306/No) and the eyelid closure time period T is 2 or more seconds (S318/Yes), in Step S321, the main control unit 21 erases the currently selected pattern or color from the storage unit 25. With this, when a pattern and a color to be erased appears in the region 1B (iris part) of the contact lens 1, the user can erase the pattern or the color by performing predetermined conscious eyelid closure (e.g., eyelid closure for 2 or more seconds).

Then, in Step S324, the adjustment control unit 21b selects a candidate pattern or color immediately before (or after) the erased pattern or color and controls the second adjustment unit 28B so as to adjust the region 1B.

Then, in the case where the number of times of blinking detected in the above S303 is 2 times within 1 second (S327/Yes), the adjustment control unit 21b performs mode switching in the detail input mode M2 in Step S328. For example, as shown in FIG. 8, in the case where the mode is currently the pattern selection mode M2-1, the mode is switched to the pattern registration mode M2-2, and, in the case where the mode is currently the color selection mode M2-3, the mode is switched to the color registration mode M2-4.

In the case where the number of times of blinking detected in the above S303 is 3 times within 1 second (S327/No, S329/Yes), the adjustment control unit 21b switches the mode to the normal input mode M1 in Step S330.

In the above description, the pattern or color selection mode has been described with reference to FIG. 9. Next, operation processing performed when the mode is switched to the pattern registration mode M2-2 or the color registration mode M2-4 will be described with reference to FIG. 10.

(3-2-2. Pattern/Color Registration Mode)

Figure 10:
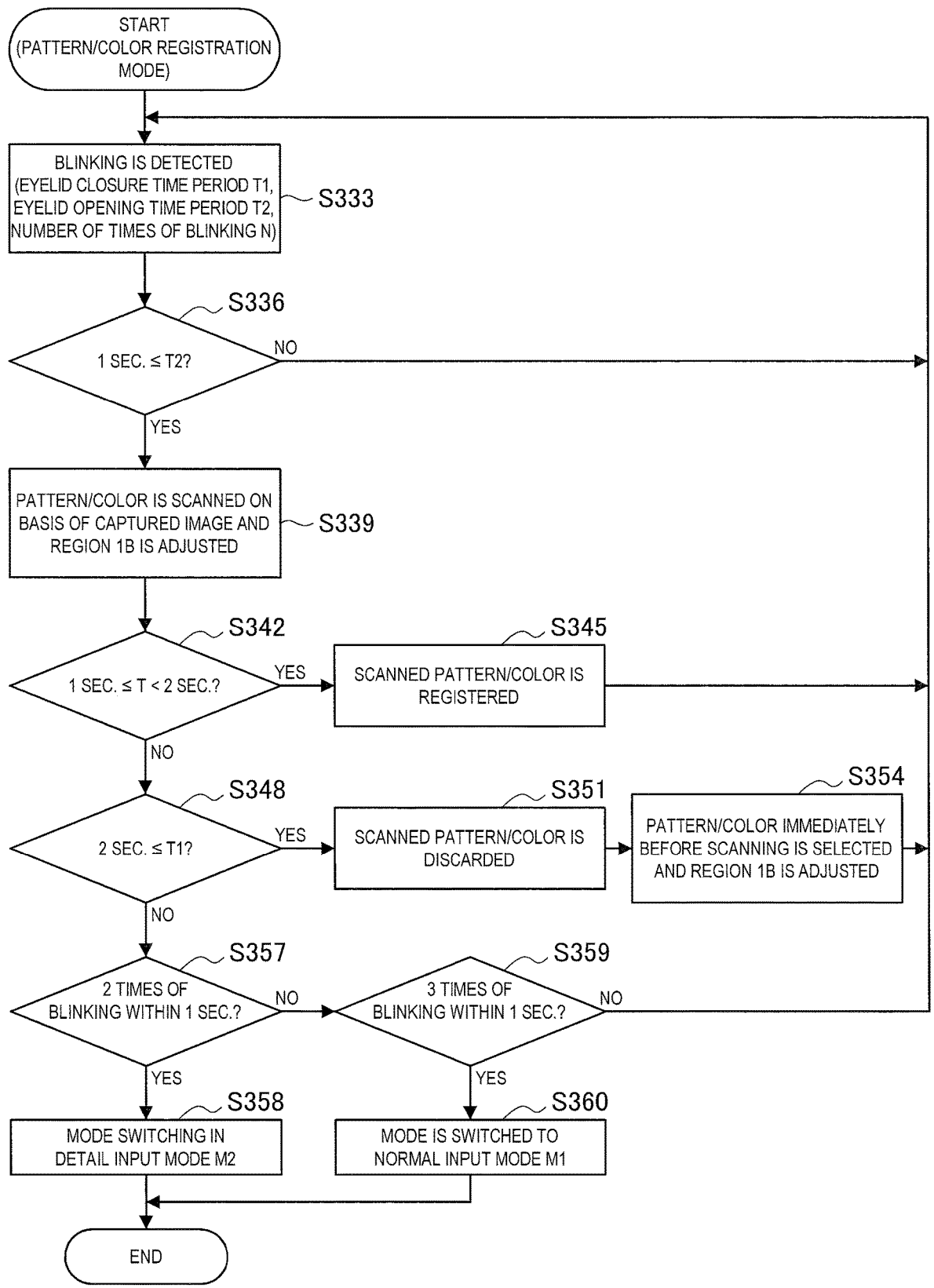
FIG. 10 is a flowchart showing processing of a pattern/color registration mode in a detail input mode according to this embodiment.

FIG. 10 is a flowchart showing processing of a pattern/color registration mode in the detail input mode according to this embodiment. In the pattern/color registration mode, the user gazes a pattern or color to be scanned, and therefore it is possible to reflect the pattern or the color in the region 1B (iris part) of the contact lens 1.

Specifically, as shown in FIG. 10, first, in Step S333, the trigger signal detection unit 21a detects blinking of the eyelid that is in contact with the contact lens 1 on the basis of captured images consecutively captured by the image pickup unit 24. Specifically, the trigger signal detection unit 21a detects an eyelid closure time period T1, an eyelid opening time period T2, and the number of times of blinking N. A detection result is output to the adjustment control unit 21b.

Then, in Step S336, the adjustment control unit 21b determines whether or not the eyelid opening time period T2 of the detected blinking is 1 or more seconds.

Next, in the case where it is determined that the eyelid opening time period T2 is 1 or more seconds (S336/Yes), in Step S339, the adjustment control unit 21b scans the pattern or color on the basis of the captured images captured by the image pickup unit 24 while the eyelid is opened. Because the image pickup lens 24a according to this embodiment is provided to capture an image in a gaze direction of the user as illustrated in FIG. 1, the image pickup unit 24 can capture an image of a paper medium, a photograph, or the like gazed by the user while the user gazes the pattern or color drawn on the paper medium, the photograph, or the like. Then, the adjustment control unit 21b extracts (cuts) the pattern or color in the captured images on the basis of an analysis result of the captured images captured by the image pickup unit 24 and controls the second adjustment unit 28B so as to adjust the region 1B to the extracted pattern or color.

Then, in the case where blinking having the eyelid closure time period T1 of 1 or more seconds but less than 2 seconds is detected (S342/Yes), in Step S345, the main control unit 21 registers the pattern or color scanned in the above S336 in the storage unit 25. With this, the user scans the pattern or color to be newly registered by gazing the pattern or color to capture an image of the pattern or color and performs predetermined conscious eyelid closure (e.g., eyelid closure for 1 or more seconds but less than 2 seconds), and thus the pattern or color can be registered.

Then, in the case where blinking having the eyelid closure time period T1 of 2 or more seconds is detected (S348/Yes), in Step S351, the main control unit 21 discards (erases) the pattern or color scanned in the above S336. With this, the user can discard the pattern or color that has been scanned and has temporarily been displayed in the region 1B by performing predetermined conscious eyelid closure (e.g., eyelid closure for 2 or more seconds).

Then, in Step S354, the adjustment control unit 21b selects again a pattern and color that has been selected before scanning and controls the second adjustment unit 28B so as to adjust the region 1B. With this, the adjustment control unit 21b can adjust the region 1B to an original pattern or color after the pattern or color that has been newly scanned is discarded in the above S351.

Then, in the case where the number of times of blinking detected in the above S333 is 2 times within 1 second (S357/Yes), the adjustment control unit 21b performs mode switching in the detail input mode M2 in Step S358. For example, as shown in FIG. 8, in the case where the mode is currently the pattern registration mode M2-2, the mode is switched to the color selection mode M2-3, and, in the case where the mode is currently the color registration mode M2-4, the mode is switched to the synchronization selection mode M2-5.

Then, in the case where the number of times of blinking detected in the above S333 is 3 times within 1 second (S357/No, S359/Yes), the adjustment control unit 21b switches the mode to the normal input mode M1 in Step S360.

In the above description, the pattern or color registration mode has been described with reference to FIG. 10. Next, operation processing performed when the mode is switched to the synchronization selection mode M2-5 will be described with reference to FIG. 11.

(3-2-3. Synchronization Selection Mode)

Figure 11:
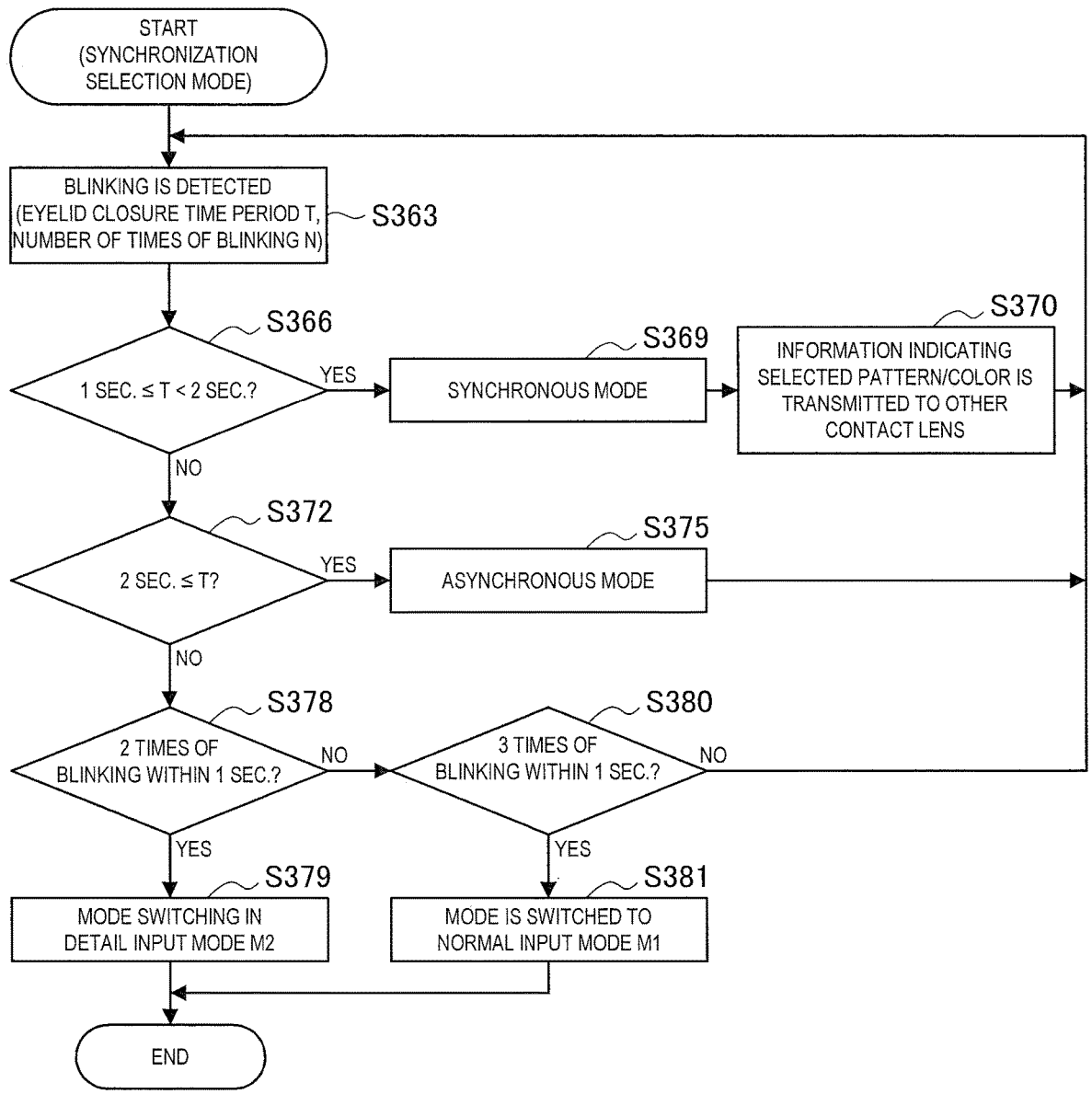
FIG. 11 is a flowchart showing processing of a synchronization selection mode in a detail input mode according to this embodiment.

FIG. 11 is a flowchart showing processing of the synchronization selection mode in the detail input mode according to this embodiment. In the synchronization selection mode, it is possible to control whether or not the region 1B (iris part) of the contact lens 1 worn on the other eye is adjusted to have the same pattern and color. In the above embodiment, in the case where the single contact lens 1 is worn on the eye 4 of the user, the pattern and the color of the region 1B (iris part) of the contact lens 1 are adjusted by the adjustment control unit 21b. Herein, in the case where the contact lens 1 according to this embodiment is also worn on the other eye of the user, it is possible to synchronize the contact lenses so that the contact lenses are adjusted to have the same pattern and color. In the case where it is desirable that right and left eyes have different appearance, the patterns and colors of the regions 1B can be non-synchronized.

Specifically, as shown in FIG. 11, first, in Step S363, the trigger signal detection unit 21a detects blinking of the eyelid that is in contact with the contact lens 1 on the basis of captured images consecutively captured by the image pickup unit 24. Specifically, the trigger signal detection unit 21a detects the eyelid closure time period T or the number of times of blinking N. A detection result is output to the adjustment control unit 21b.

Then, in Step S366, the adjustment control unit 21b determines whether or not the eyelid closure time period T of the detected blinking is 1 or more seconds but less than 2 seconds.

Then, in the case where the eyelid closure time period T of the detected blinking is 1 or more seconds but less than 2 seconds (S366/Yes), the main control unit 21 sets a synchronous mode in Step S369.

Then, in Step S370, the main control unit 21 controls information indicating any one of the pattern and the color that are currently selected by the adjustment control unit 21b so that the information is transmitted to the contact lens 1 worn on the other eye of the user. With this, the region 1B in the contact lens 1 worn on the other eye can be adjusted to have the same pattern and color.

Meanwhile, in the case where the eyelid closure time period T of the detected blinking is 2 or more seconds (S366/No, S372/Yes), the main control unit 21 sets an asynchronous mode in Step S375. In this case, no information is transmitted to the contact lens 1 worn on the other eye.

Then, in the case where the number of times of blinking detected in the above S363 is 2 times within 1 second (S378/Yes), the adjustment control unit 21b performs mode switching in the detail input mode M2 in Step S379. For example, as shown in FIG. 8, in the case where the mode is currently the synchronization selection mode M2-5, the mode is switched to the pattern selection mode M2-1.

Then, in the case where the number of times of blinking detected in the above S363 is 3 times within 1 second (S378/No, S380/Yes), the adjustment control unit 21b switches the mode to the normal input mode M1 in Step S381.

As described above, the user can select synchronization/non-synchronization with the contact lens 1 worn on the other eye by performing predetermined conscious eyelid closure (e.g., eyelid closure for 1 or more seconds but less than 2 seconds or eyelid closure for 2 or more seconds).

Note that the above numerical values of respective criteria ("eyelid closure for 1 or more seconds but less than 2 seconds", "eyelid closure for 2 or more seconds", and the like) are merely examples, and this embodiment is not limited to the above numerical values.

In switching of the determination input mode (normal input mode M1, detail input mode M2, or mode switching in detail input mode M2) of the pattern or color in the region 1B that has been described with reference to FIG. 6 to FIG. 11 and in the adjustment processing of the pattern or color, blinking input is used as an example, but another input method may be used. For example, it is possible to perform processing with the use of gesture input in the same way as the above algorithm as long as different kinds of gestures corresponding to the above "2 or 3 times of blinking within 1 second", "eyelid closure (usual blinking) for less than 1 second", "eyelid closure for 1 or more seconds but less than 2 seconds", "eyelid closure for 2 or more seconds", and the like can be defined.

<<4. Conclusion>>

As described above, by actively adjusting light to be transmitted through the lens unit 10 (regions 1A, 1B) in the contact lens 1 according to this embodiment, it is possible to reduce a light amount to be transmitted in accordance with ultraviolet rays or intense light and to adjust a color and a pattern of appearance of a contact lens. This remarkably improves usability of the contact lens 1.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, it is also possible to prepare a computer program for causing hardware, such as a CPU, a ROM, and a RAM included in the circuit unit 20 of the contact lens 1, to exert each function of the main control unit 21 of the contact lens 1 described above. Further, a computer readable storage medium storing the computer program is also provided.

Further, each flowchart shows a flow from "START" to "END" for the corresponding function, but, actually, a loop of the processing of each flowchart is performed while power supply of the contact lens 1 is ON (while power supply is being supplied).

Further, in the above embodiment, the color and the pattern of the region 1B are changed in accordance with operation input (blinking input or the like) by the user, but this embodiment is not limited thereto. For example, the color and the pattern of the region 1B may be changed in accordance with time.

The information indicating the pattern and the color of the region 1B selected by the adjustment control unit 21b is transmitted to an external device (e.g., smartphone or tablet terminal) via the wireless communication processing unit 22 and the antenna 23 and may be displayed in the external device. With this, the user can check a change in the color or the pattern of the region 1B of the contact lens worn on his/her eye 4 with the use of a smartphone or the like.

Further, soft contact lenses and hard contact lenses having different properties of the lenses and different lens diameters are generally known as contact lenses, and the contact lens 1 according to this embodiment is applicable to either type thereof.

Additionally, the present technology may also be configured as below.

(1)

A contact lens including:

a lens unit configured to be worn on an eyeball;

an adjustment unit configured to adjust light to be transmitted through at least one of a first region that is a central portion of the lens unit and covers a pupil of the eyeball and a second region that is an outer side of the first region and covers an iris of the eyeball; and a control unit configured to control the adjustment unit in response to input of a trigger signal.

(2)

The contact lens according to (1), wherein the adjustment unit adjusts an amount of light to be transmitted through the first region of the lens unit.

(3)

The contact lens according to (1) or (2), wherein the adjustment unit adjusts a wavelength region of light to be transmitted through the first region of the lens unit.

(4)

The contact lens according to any one of (1) to (3), wherein the adjustment unit adjusts at least one of a color and a pattern of the second region of the lens unit.

(5)

The contact lens according to any one of (1) to (4), further including:

an image pickup unit configured to capture an image of a subject, the image pickup unit being provided in the lens unit.

(6)

The contact lens according to (5), wherein the control unit detects a particular gesture as the trigger signal on the basis of a captured image captured by the image pickup unit and controls the adjustment unit in accordance with the detected gesture.

(7)

The contact lens according to (5), wherein the control unit detects conscious eyelid closure as the trigger signal on the basis of a captured image captured by the image pickup unit and controls the adjustment unit in accordance with at least one of a time period, the number of times, and a pattern of the detected eyelid closure.

(8)

The contact lens according to (5), wherein the control unit detects a light amount as the trigger signal on the basis of a captured image captured by the image pickup unit and controls the adjustment unit in accordance with the detected light amount.

(9)

The contact lens according to any one of (1) to (4), further including:

a communication unit provided in the lens unit, wherein the control unit controls the adjustment unit in accordance with the trigger signal received by the communication unit.

(10)

The contact lens according to any one of (1) to (4), including:

at least one of a pressure sensor, a magnetic force sensor, a vibration sensor, and an acceleration sensor, wherein the control unit detects a sensing result of the sensor as the trigger signal and controls the adjustment unit in accordance with the detected sensing result.

(11)

The contact lens according to any one of (1) to (10), wherein the adjustment unit includes a dye-sensitized solar cell.

(12)

The contact lens according to any one of (1) to (11), wherein the first region of the lens unit has a diameter of at least 8 mm.

(13)

A storage medium having a program stored therein, the program causing a computer to function as:

an adjustment unit configured to adjust light to be transmitted through at least one of a first region that is a central portion of a lens unit configured to be worn on an eyeball and covers a pupil of the eyeball and a second region that is an outer side of the first region and covers an iris of the eyeball; and a control unit configured to control the adjustment unit in response to input of a trigger signal.

REFERENCE SIGNS LIST 1 contact lens
2 iris
3 pupil
4 eye
4A eyeball
10 lens unit
20 circuit unit
21 main control unit
21a trigger signal detection unit
21b adjustment control unit
22 wireless communication processing unit
23 antenna
24 image pickup unit
24a image pickup lens
25 storage unit
27 sensor
28A first adjustment unit
28B second adjustment unit

The invention claimed is:

1. A contact lens, comprising:
a wearable lens that comprises a first region and a second region, wherein the first region is in a central portion of the wearable lens, and the second region is an outer side of the first region;
an image pickup device configured to capture an image; and
circuitry configured to:
  detect reception of an ultraviolet light as a first trigger signal based on the captured image;
  generate a first control signal based on the detection of the reception of ultraviolet light as the first trigger signal;
  control adjustment of a wavelength region of light, transmitted through the first region of the wearable lens, based on the generated first control signal;
  detect eyelid closure as a second trigger signal based on the captured image, wherein the first trigger signal is different from the second trigger signal;
  select at least one of a specific color of a plurality of colors or a specific pattern of a plurality of patterns of the second region of the wearable lens based on at least one of a time period of the detected eyelid closure, a number of times of the detected eyelid closure, or a pattern of the detected eyelid closure;
  generate a second control signal that corresponds to the selected at least one of the specific color or the specific pattern; and
  control adjustment of the second region of the wearable lens based on the generated second control signal.

2. The contact lens according to claim 1,
wherein the circuitry is further configured to control adjustment of a transmission amount of light transmitted through the first region of the wearable lens.

3. The contact lens according to claim 1, wherein the captured image is of a subject, and the image pickup device is in the wearable lens.

4. The contact lens according to claim 3,
wherein the circuitry is further configured to:
  detect a gesture as the second trigger signal based on the captured image; and
  select the at least one of the specific color or the specific pattern of the second region based on the detected gesture.

5. The contact lens according to claim 3,
wherein the circuitry is further configured to:
  detect a light amount as the first trigger signal based on the captured image; and
  control the adjustment of the wavelength region based on the detected light amount.

6. The contact lens according to claim 5,
wherein the circuitry is further configured to:
  control to reduce transmittance of the light transmitted through the first region based on a value of the detected light amount that is greater than a threshold value; and
  control to increase the transmittance of the light transmitted through the first region based on the value of the detected light amount that is lower than the threshold value.

7. The contact lens according to claim 1, further comprising:
a communication device in the wearable lens,
wherein the circuitry is further configured to acquire the at least one of the first trigger signal or the second trigger signal from the communication device.

8. The contact lens according to claim 1, further comprising:
at least one sensor that comprises one of a pressure sensor, a magnetic force sensor, a vibration sensor, or an acceleration sensor,
wherein the circuitry is further configured to:
  detect a sensing result of the at least one sensor as the at least one of the first trigger signal or the second trigger signal;
  control the adjustment of one of the wavelength region based on the detected sensing result; and
  select the at least one of the specific color or the specific pattern based on the detected sensing result.

9. The contact lens according to claim 1, wherein
the first region comprises one of a liquid crystal shutter or a polarized filter, and
the second region comprises one of a color filter or a dye-sensitized solar cell.

10. The contact lens according to claim 1,
wherein the first region of the wearable lens has a diameter of at least 8 mm.

11. A non-transitory computer-readable medium having stored thereon, computer-executable instructions, which when executed by a computer, cause the computer to execute operations, the operations comprising:
detecting reception of an ultraviolet light as a first trigger signal based on a captured image;
generating a first control signal based on the detection of the reception of ultraviolet light as the first trigger signal;
controlling adjustment of a wavelength region of light, transmitted through a first region of a wearable lens, based on the generated first control signal;
detecting eyelid closure as a second trigger signal based on the captured image, wherein
  the captured image is captured by an image pickup device, and
  the first trigger signal is different from the second trigger signal;

selecting at least one of a specific color of a plurality of colors or a specific pattern of a plurality of patterns of a second region of the wearable lens based on at least one of a time period of the detected eyelid closure, a number of times of the detected eyelid closure, or a pattern of the detected eyelid closure,
   wherein the first region is a central portion of the wearable lens and the second region is an outer side of the first region;

generating a second control signal that corresponds to the selected at least one of the specific color or the specific pattern; and controlling adjustment of the second region of the wearable lens based on the generated second control signal.

* * * * *